United States Patent [19]

Herren

[11] Patent Number: 4,821,871
[45] Date of Patent: Apr. 18, 1989

[54] IDLER PULLEY SURFACING

[76] Inventor: Harold L. Herren, 802 Main St., Platteville, Colo. 80651

[21] Appl. No.: 144,018

[22] Filed: Jan. 13, 1988

[51] Int. Cl.$^4$ .............................. B65G 39/10
[52] U.S. Cl. ................. 198/843; 474/188; 474/192; 428/134; 428/137; 29/402.09; 29/402.16; 29/132
[58] Field of Search .......... 198/780, 842, 843, 835; 193/37; 474/188, 191, 192; 29/402.09, 402.16, 132; 428/131, 134, 137, 492

[56] References Cited

U.S. PATENT DOCUMENTS

| 2,119,578 | 6/1938 | Gustafson | 474/191 |
| 2,524,328 | 10/1950 | Platt et al. | 198/835 |
| 3,010,332 | 11/1961 | Skates | 474/191 |
| 4,284,409 | 8/1981 | Van Teslaar | 474/188 |
| 4,718,544 | 1/1988 | Herren | 198/843 |

FOREIGN PATENT DOCUMENTS

| 622595 | 4/1981 | Switzerland | 474/191 |
| 738964 | 6/1980 | U.S.S.R. | 474/191 |

Primary Examiner—Joseph E. Valenza
Attorney, Agent, or Firm—Dean P. Edmundson

[57] ABSTRACT

A flexible rubber strip or sheet is described which is useful as surfacing material on an idler pulley or the like. The rubber strip includes a row of openings along each end. A pair of spaced-apart metal strips is secured to each end of the rubber strip. A portion of each metal strip is exposed in the openings to enable it to be welded to the surface of a pulley to secure the rubber strip to the pulley to thereby provide a wear surface.

10 Claims, 9 Drawing Sheets

IDLER PULLEY SURFACING

FIELD OF THE INVENTION

This invention relates to idler pulley surfacing and repair techniques. More particularly, this invention relates to techniques for extending the useful life of idler pulleys (such as are used in material conveyer systems).

BACKGROUND OF THE INVENTION

Large material conveyer systems are in widespread use in various industries for moving materials from one location to another. For example, conveyer systems are used to move sand, gravel, crushed ore or rock, coal, and other materials, depending upon the particular industry involved.

Material conveyers typically include a very long endless belt which is supported on rollers carried by a large elongated frame. Large forces are involved due to the great weight of the material being conveyed and the speed at which the belt is driven. The rollers (e.g., idler pulleys) normally have a cylindrical metal body which is rotatably supported at each end by a bearing. A shaft extends outwardly from each end of the roller or pulley and is connected to the bearing.

After a period of use, one or both of the bearings in an idler pulley will fail. This can result in lack of rotational freedom of the pulley (i.e., it fails to rotate when the conveyer belt moves over it). As a result, the conveyer belt can cause extraordinary wear of the cylindrical body of the pulley. Even if the bearings do not fail, the conveyer belt will also cause wear of the cylindrical body of the pulley.

When the pulley becomes unduly worn, whether because a bearing fails or because of lengthy use of a conveyer, it is necessary to either replace the entire pulley or repair it. Replacement of the entire pulley is expensive.

A previously proposed method for repairing a heavily worn pulley involves placing a rubber sleeve over it to provide a new wearing surface. This technique has a number of disadvantages associated with it, however.

For example, the sleeve must have an internal diameter slightly smaller than the diameter of the pulley to be repaired. Then the sleeve must be driven onto the pulley from one end. Of course, the pulley must be first removed from the conveyer before it can be repaired with such technique. The sleeve may even have to be heated in order to obtain sufficient pliability to enable it to be placed over the pulley.

Also, because idler pulleys of many different diameters and lengths are in conventional use, it would be necessary to manufacture and stock numerous different sizes of sleeves if they are to be used as repair items. Furthermore, the surface of idler pulleys wear unevenly. As a result, the diameter of the pulley can vary along its length when it becomes worn. This compounds the problem of obtaining proper fit of an off-the-shelf sleeve on a worn pulley in the field.

There has not heretofore been provided an effective and inexpensive technique for repair of worn idler pulleys of various diameters and lengths.

SUMMARY OF THE PRESENT INVENTION

In accordance with the present invention there is provided, in one embodiment, a flexible rubber strip which is suitable for attachment to the surface of an idler pulley or the like to provide a wear surface for the pulley. The flexible rubber strip can be used as a repair item for worn pulleys or as a wear surfacing for a new pulley.

The flexible rubber strip has first and second ends, each of which includes a row of openings therealong. A pair of spaced-apart metal strips extends across each end of the rubber strip in a manner such that a portion of each metal strip is exposed in the openings in the rubber strip. That is, one pair of metal strips extends transversely across the rubber strip at one end, and another pair of metal strips extends transversely across the other end of the rubber strip. In the openings at each end of the rubber strip a portion of each metal strip at that end is exposed. This enables the metal strips to be secured to the pulley surface by welding.

The rubber strip material can be provided in any desired width and then can be cut to the width required for surfacing a particular pulley. Additional rows of transverse openings (and corresponding pairs of metal strips) can also be provided. This enables the rubber strip to be cut in the transverse direction in order to shorten the strip (e.g., for placement on smaller diameter pulleys).

The rubber strip material can be placed on and secured to the pulley surface without disassembly of the apparatus in which the pulley is contained. Also, the rubber strip material can be provided in any desired thickness.

Other advantages of the present invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

In FIGS. 1-6 there is illustrated one embodiment of flexible rubber strip material 10 of the invention which includes a row of openings 11 extending transversely across one end of the strip and a row of openings 12 extending transversely across the other end of the strip. In this embodiment there is also illustrated a center row of transverse openings 13.

Associated with each row of transverse openings is a pair of spaced-apart metal strips or bars. Thus, metal strips 11A are secured to one end of the rubber strip and extend transversely across the rubber strip. A portion 11B of each metal strip is exposed in each opening 11, as illustrated. Similarly, metal strips 12A are secured to the opposite end of the rubber strip and extend transversely across the rubber strip. A portion 12B of each metal strip is exposed in each opening 12, as illustrated. A similar situation is presented near the mid-section of the rubber strip with respect to openings 13 and metal strips 13A and portions 13B.

Between the openings in the rubber strip there preferably are extensible leg members or portions 14. Because these leg members are extensible, the rubber strip material can be stretched, if necessary, in order to more closely fit around a particular pulley. The leg members also help to hold the metal strips against the pulley surface. If desired, the leg members could be metal and could be an integral part of the metal strips themselves. As another alternative, the leg members may be a composite of rubber and metal.

Figure 1:
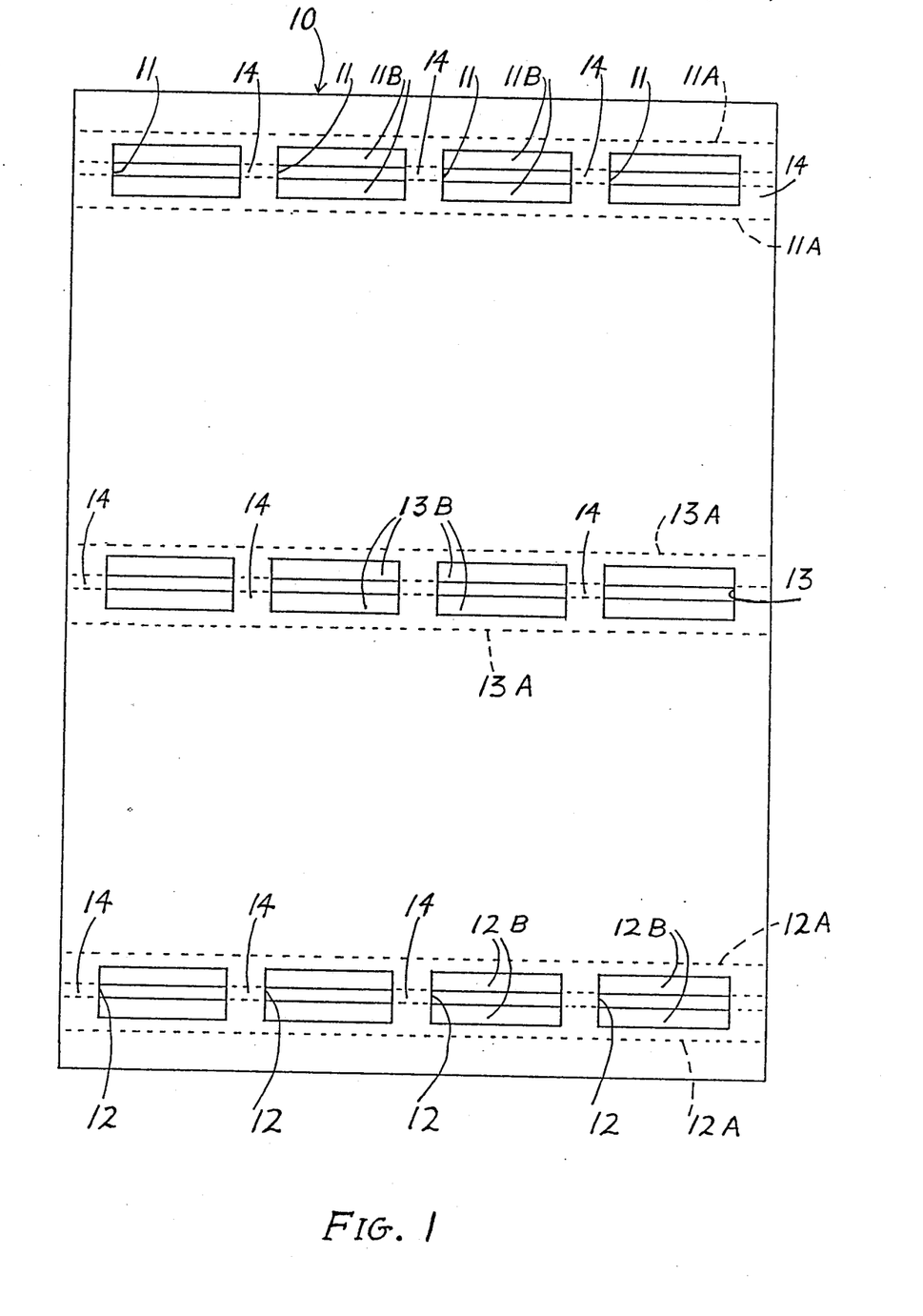
FIG. 1 is a top view of one embodiment of flexible rubber strip material of this invention.
Figure 2:
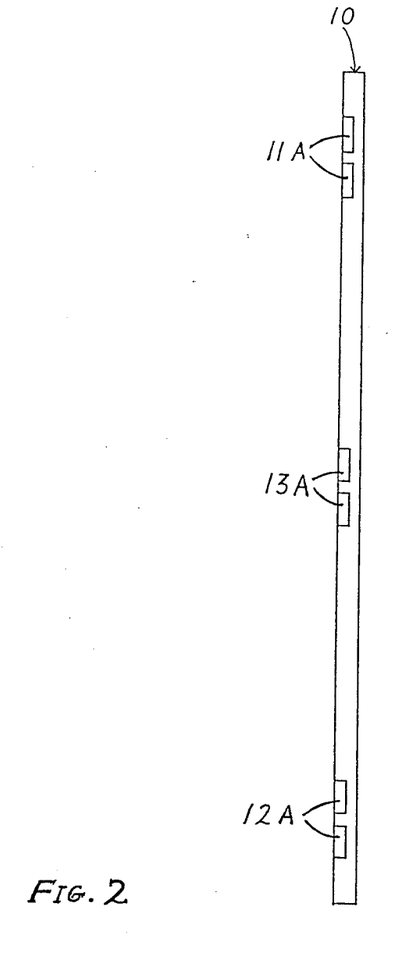
FIG. 2 is a side elevational view of the strip material shown in FIG. 1.
Figure 3:
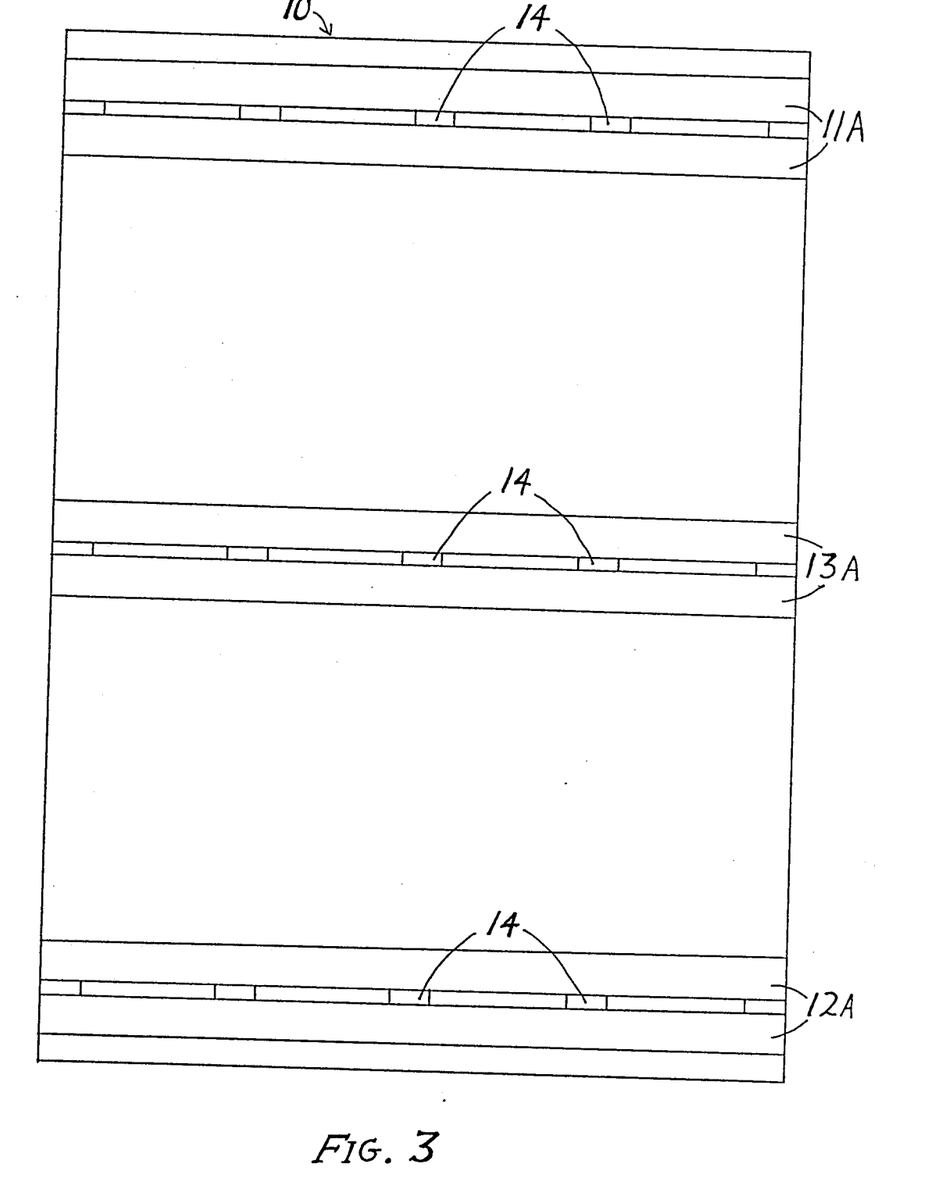
FIG. 3 is a bottom view of the strip material shown in FIG. 1.
Figure 4:
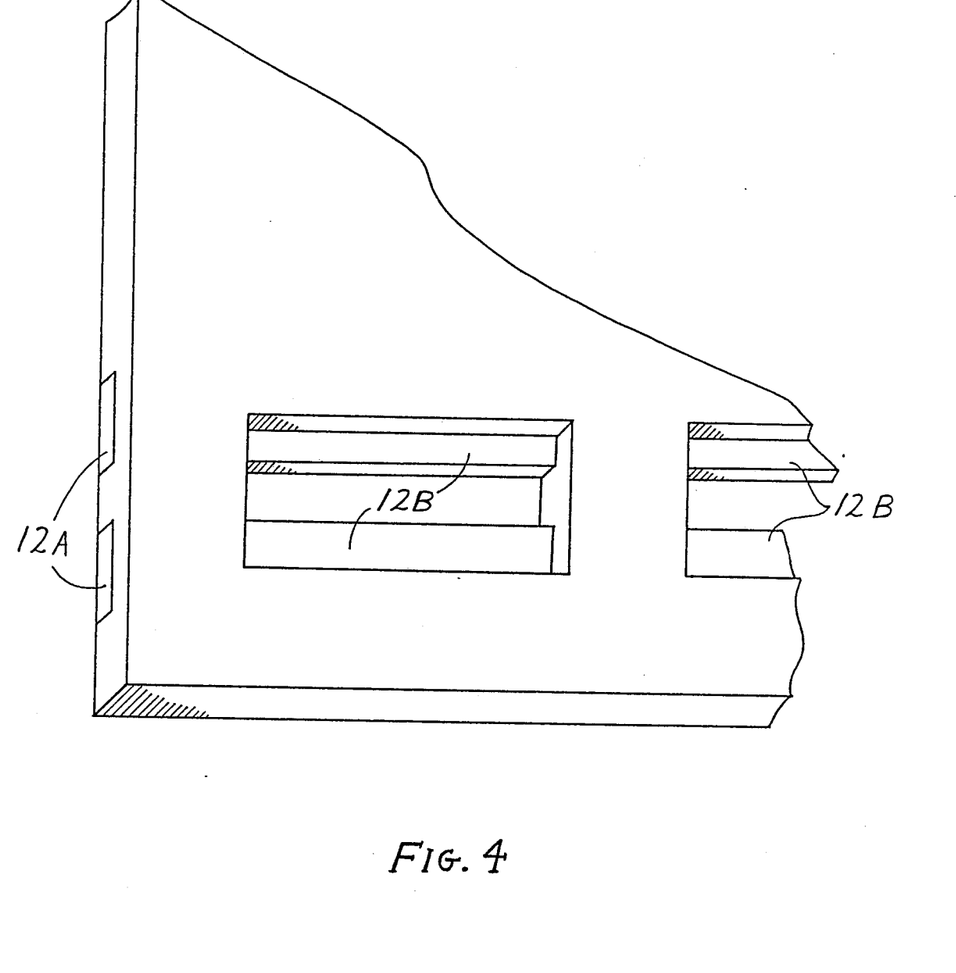
FIG. 4 is a fragmentary top perspective view of the strip material shown in FIG. 1.
Figure 5:
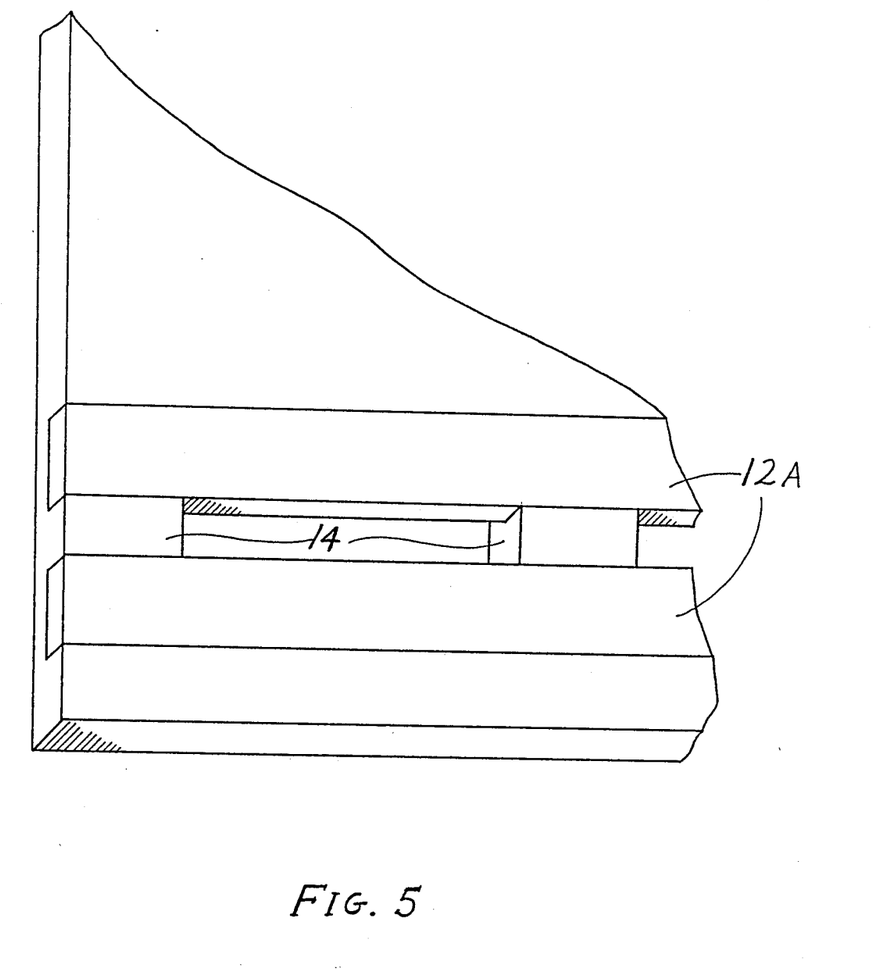
FIG. 5 is a fragmentary bottom perspective view of the strip material shown in FIG. 1.
Figure 6:
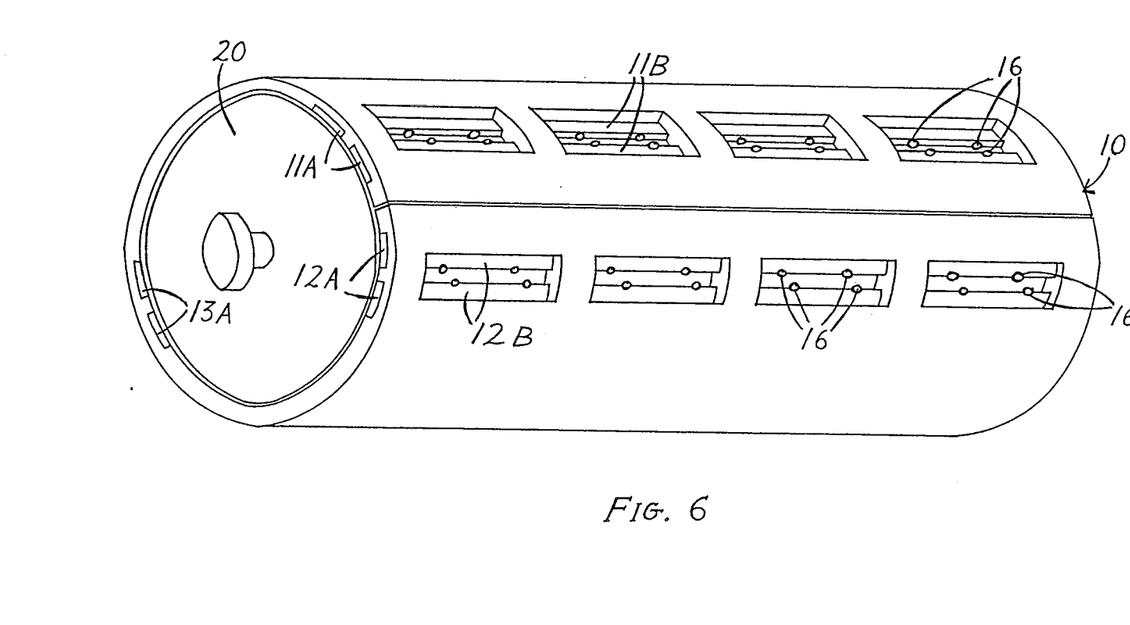
FIG. 6 is a perspective view of a pulley to which a flexible rubber repair strip of the invention has been secured.

In order to secure the rubber strip material to the periphery of a pulley 20, one end of the strip material is laid onto the pulley surface. Then the exposed portions of the metal strips are secured to the pulley (for example, by spot welds 16), as illustrated. Then the rubber strip material is wrapped around the pulley and is secured in the other areas where the metal strips are exposed through the openings in the rubber strip. This provides a very durable wearing surface for the pulley.

Figure 7:
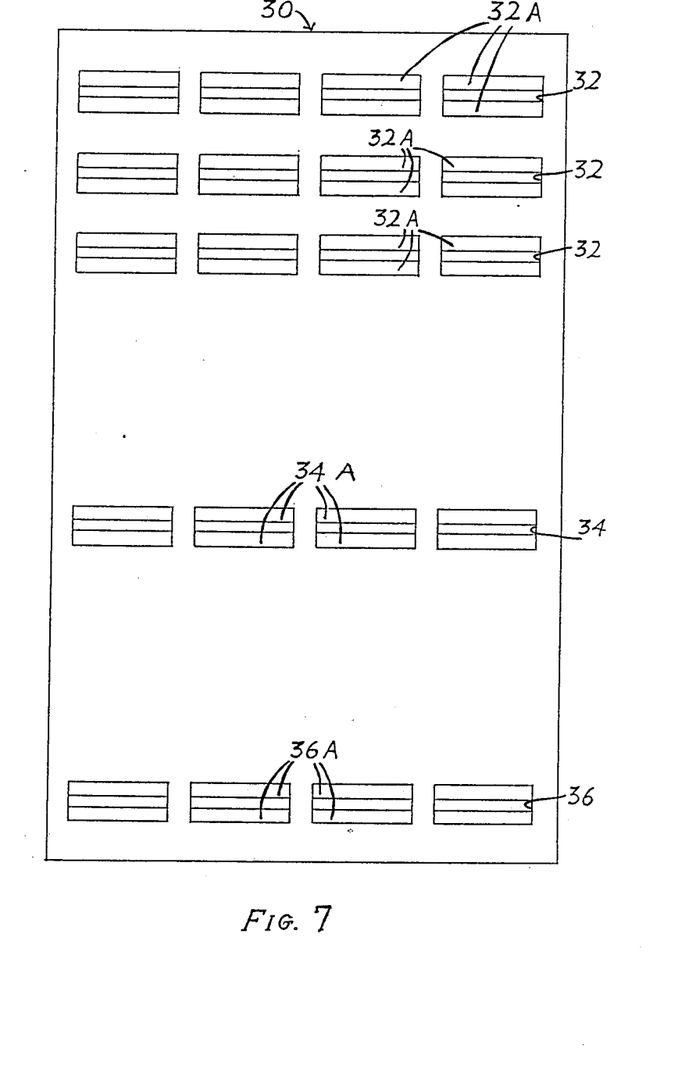
FIG. 7 is a top view of another embodiment of flexible rubber strip material of the invention.

Another embodiment of rubber strip material 30 is illustrated in FIG. 7. In this embodiment there are illustrated a plurality of rows of openings 32 extending transversely across one end of the rubber strip. Another row of openings 34 is present near the mid-section of the rubber strip, and another row of openings 36 is present at the other end of the rubber strip.

A pair of spaced-apart metal strips or bars extends transversely across the rubber strip material below each row of openings in a manner such that a portion of each metal strip is exposed in the openings, as illustrated. Thus, under each row of openings 32 there is secured a pair of metal strips having exposed portions 32A. Under openings 34 there is secured a pair of metal strips having exposed portions 34A. Also, under openings 36 there is secured a pair of metal strips having exposed portions 36A.

In the embodiment shown in FIG. 7, the rubber strip can be cut to a desired length to fit a particular diameter pulley. For example, the rubber strip can be easily cut transversely between any of the rows of openings 32 to provide the desired length.

Figure 8:
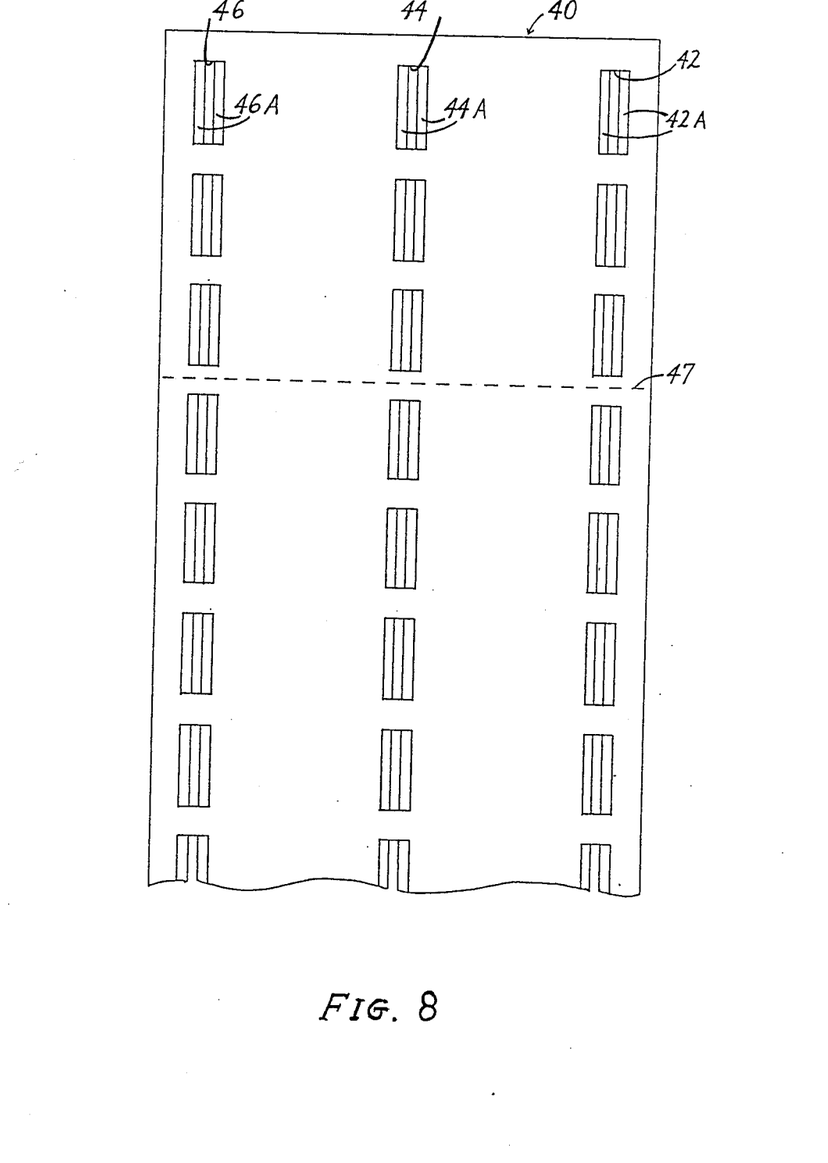
FIG. 8 is a top view of another embodiment of flexible rubber material of the invention in sheet form.

FIG. 8 illustrates yet another embodiment of rubber strip material 40 of the invention. In this embodiment the strip material is in a wide sheet form. There are rows of transverse openings 42, 44 and 46 shown. A pair of metal strips is secured to the underside of the sheet under each row of openings. Portions of each metal strip are exposed in the openings and are designated 42A, 44A and 46A, respectively.

With the sheet form of rubber strip material illustrated in FIG. 8 it is possible to cut a rubber strip portion of any desired width. For example, it is possible to cut along dotted line 47, as illustrated. Thus, the rubber strip can be manufactured in a wide sheet form and then cut to the desired width by the ultimate user or by the dealer.

This is very advantageous because the lengths of pulleys in the field will typically vary over a wide range. Therefore, it is not practical to manufacture rubber strip material in a variety of predetermined standard widths.

Figure 9:
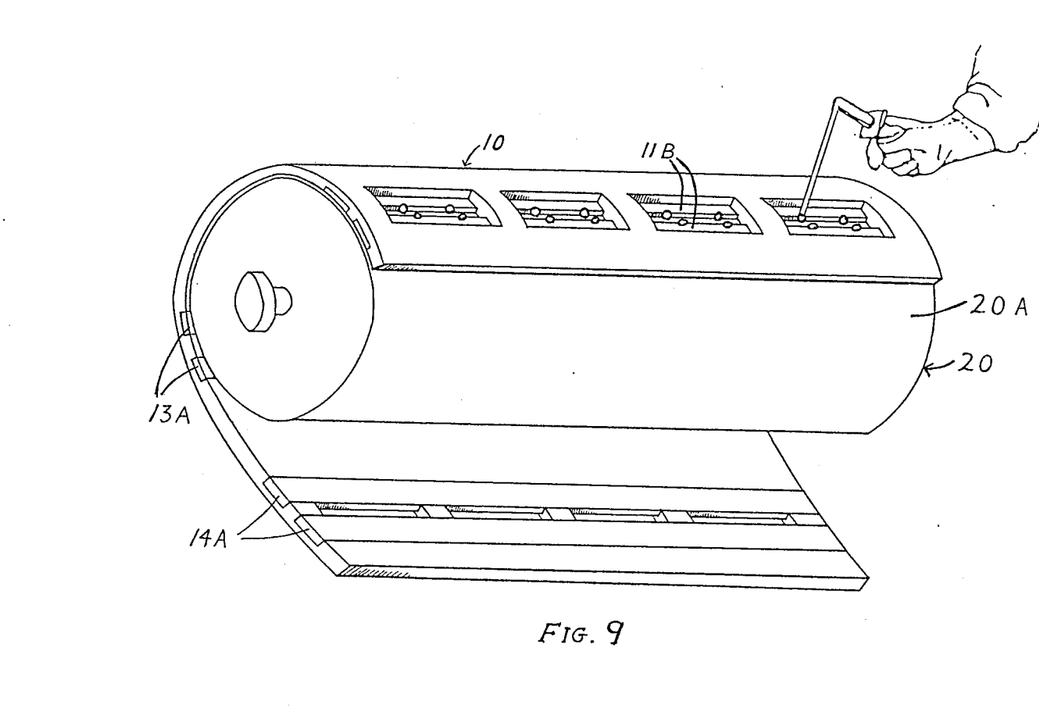
FIG. 9 illustrates a preferred manner of securing a flexible rubber strip material of the invention to a pulley surface.

FIG. 9 illustrates a preferred manner of securing a rubber strip material 10 of the invention to a pulley surface 20A of pulley 20. Each metal strip exposed in the openings in the rubber strip is spot welded to the pulley surface, as illustrated. One end of the rubber strip 10 is secured first and then the rubber strip material is wrapped around the pulley, followed by spot welding of the exposed metal strips to the pulley surface.

The rubber strip material of this invention can be provided in a variety of embodiments. The thickness of the rubber material may vary, for example, from about 0.06 inch to 0.5 inch, so long as it is flexible and durable. The width of the rubber strip may vary over a broad range (e.g., 6 inches to 60 inches). The length may also vary. For most purposes, a length in the range of about 12 to 25 inches is sufficient in order to accommodate pulleys having diameters of about 3 to 8 inches. If a pulley to be surfaced is smaller or larger than this, the length of the strip can be adjusted accordingly.

Similarly, the thickness of the metal used in each strip may vary, e.g., from about 0.05 to 0.20 inch. The width of each metal strip may also vary, e.g., from about 0.375 to about 1 inch. If desired, the metal strips can be slightly arced so as to conform more closely to the pulley surface. For example, when the metal strips are about 0.5 inch wide or wider, and more than about 0.06 inch thick, it may be desirable to provide an arc shape across the width of the metal strip. The spacing between metal strips may also vary.

The size of each opening in the rubber strip material may also vary. Typically the length of each opening is in the range of about 0.75 to about 2 inches and the width of each opening is in the range of about 0.25 to about 1 inch.

The leg members between the ends of adjacent openings are normally in the range of about 0.25 to about 0.75 inch in width so that it is possible to manually stretch the rubber, if necessary, when fitting the rubber strip material around a pulley.

Other variants are possible without departing from the scope of this invention. For example, the metal strips can be recessed into the rubber strip, as illustrated. They may be secured to the rubber strip in any suitable manner. Preferably the metal strips are placed in the mold for the rubber so that when the rubber is vulcanized it becomes bonded to the metal strips.

What is claimed is:

1. A flexible rubber strip having first and second ends, wherein said first end includes a row of openings therealong and said second end includes a row of openings therealong, wherein a pair of spaced-apart metal strips are secured to each said end of said rubber strip, wherein a portion of each said metal strip is exposed in said openings; wherein when said rubber strip is wrapped around a pulley, said portion of each said metal strip can be welded to said pulley to secure said rubber strip to said pulley.

2. A flexible rubber strip in accordance with claim 1, wherein said rubber strip includes extensible leg members separating said openings at each said end of said rubber strip.

3. A flexible rubber strip in accordance with claim 1, wherein said rubber strip includes a third row of openings between said ends of said strip, wherein said third row of openings extends transversely across said rubber strip, and wherein a third pair of spaced-apart metal strips extends across said rubber strip and is secured thereto in a manner such that a portion of each said metal strip is exposed in said third row of openings.

4. A flexible rubber strip in accordance with claim 1, wherein said first end of said rubber strip includes two rows of openings therealong, said two rows being parallel to each other, wherein a pair of spaced-apart metal strips extend across said rubber strip beneath each said row of openings and are secured to said rubber strip in a manner such that a portion of each said metal strip in one said pair is exposed in said openings of one said row of openings and a portion of each said metal strip in the other said pair is exposed in said openings of the other said row of openings.

5. A flexible rubber strip in accordance with claim 1, wherein said metal strips are disposed in transverse recesses in said rubber strip.

6. A flexible rubber strip in accordance with claim 1, wherein said rubber strip has a width in the range of about 6 to 60 inches and a length in the range of about 12 to 25 inches.

7. An idler pulley having secured to the periphery thereof a flexible rubber strip having first and second ends, wherein said first end includes a row of openings therealong and said second end includes a row of openings therealong, wherein a pair of spaced-apart metal strips are secured to each said end of said rubber strip, wherein a portion of each said metal strip is exposed in said openings; wherein each said metal strip is welded to said pulley.

8. A flexible rubber sheet having first and second ends, wherein each said end includes a first row of openings therealong and said second end includes a row of openings therealong, wherein a pair of spaced-apart metal strips are secured to each said end of said rubber sheet, wherein a portion of each said metal strip is exposed in said openings; wherein said sheet may be trimmed to form a rubber strip of desired width for placement around a pulley to provide a traction surface.

9. A flexible rubber sheet in accordance with claim 8, wherein said rubber sheet includes extensible leg members separating said openings at each said end of said rubber sheet.

10. A flexible rubber sheet in accordance with claim 8, wherein said sheet includes a third row of openings between said ends of said sheet, wherein said third row of openings extends transversely across said sheet, and wherein a third pair of spaced-apart metal strips extends across said sheet and is secured thereto in a manner such that a portion of each said metal strip is exposed in said third row of openings.

* * * * *